US006405177B1

(12) United States Patent
DiMattina

(10) Patent No.: US 6,405,177 B1
(45) Date of Patent: Jun. 11, 2002

(54) SYSTEM FOR SECURING COMMERCIAL TRANSACTIONS CONDUCTED ON-LINE

(76) Inventor: Joseph DiMattina, 18 Harborview Dr., Atlantic Highlands, NJ (US) 07716

(*) Notice: Subject to any disclaimer, the term of this patent is extended or adjusted under 35 U.S.C. 154(b) by 0 days.

(21) Appl. No.: 09/561,069

(22) Filed: Apr. 28, 2000

(51) Int. Cl.[7] .................................. G06F 17/60

(52) U.S. Cl. .................. 705/26; 705/27; 705/4

(58) Field of Search .................. 705/26, 27, 4

(56) References Cited

U.S. PATENT DOCUMENTS 5,899,980 A * 5/1999 Wilf et al. .................... 705/26
6,029,150 A * 2/2000 Kravitz ........................ 705/26
6,188,994 B1 * 2/2001 Egendorf ..................... 705/26

FOREIGN PATENT DOCUMENTS

WO WO 97/03410 * 1/1997 ........... G06F/17/60
WO WO 00/52623 * 9/2000 ........... G06F/17/60

OTHER PUBLICATIONS

Cashell et al., Web Trust: A Seal of Approval (June 1999), Internal Auditor, v56n3, pp:50–53.*

* cited by examiner

*Primary Examiner*—Kenneth R. Rice
*Assistant Examiner*—Lynda Jasmin
(74) *Attorney, Agent, or Firm*—Levisohn, Lerner, Berger & Langsam

(57) ABSTRACT

The invention is an on-line business method which will enable on-line retailers to offer the following on-line financial guarantee services to their customers: the financial guarantee of a secure credit card transaction; the financial guarantee of a genuine product at the advertised purchase price; the financial guarantee of the delivery and return policy of the item being purchased; and the financial guarantee that the implied or specific warranty of the item purchased will be honored. All of the above services are offered as a one-click point of sale solution.

15 Claims, 4 Drawing Sheets

SYSTEM FOR SECURING COMMERCIAL TRANSACTIONS CONDUCTED ON-LINE

FIELD OF THE INVENTION

The present invention relates to the field of Internet based business-to-business services. More specifically, the present invention relates to an Internet-based commercial transaction insurance system allowing on-line retailers to offer insurance which provides their customers with various financial guarantees in a one-click setting at the point-of-sale.

BACKGROUND OF THE INVENTION

B2B (business-to-business) electronic commerce is the exchange of products, services, or information on the Internet between businesses rather than between businesses and consumers. Although early interest centered on the growth of retailing on the Internet, forecasts are that B2B revenue will far exceed business-to-consumers (B2C) revenue in the near future. According to studies published earlier this year, the money volume of B2B exceeds that of B2C by 10 to 1. Over the next five years, B2B is expected to have a compound annual growth of 41%. The Gartner Group estimates B2B revenue worldwide to be $7.29 trillion dollars by 2004.

There are several B2B business models currently recognized on the Internet. The most widely known and available B2B model is a company website, since the target audience for many company websites is other companies and their employees. Company sites can be thought of as round-the-clock mini trade exhibits. Sometimes a company website serves as the entrance to an exclusive extranet available only to its business customers or registered site users. Such company websites usually sell directly from the site, effectively e-tailing to other businesses. Other B2B models currently include product supply and procurement exchanges, where a company purchasing agent can shop for supplies from vendors, request proposals, and, in some cases, bid to make a purchase at a desired price; brokering sites which act as an intermediary between someone wanting a product or service and potential providers; vertical industry portals which provide a "sub web" of information, product listings and other features; and information sites, sometimes known as infomediaries. The present invention was designed to be used primarily with a company website B2B model, however, it may be used with any of the above described models.

Consumers, especially business consumers, new to e-commerce have vague fears about the Web. Seals of approval, for example provided by TRUSTe.com, has so far been the only solution for reassuring a purchaser that control over the transaction can be established. TRUSTe.com is the Internet industry's privacy seal program provided by a non-profit organization dedicated to building trust and confidence on the Internet through a third-party oversight "seal" program. TRUSTe.com assures users that sites are indeed doing what they claim through periodic site reviews and provides consumers with a dispute resolution mechanism. Sites that have successfully met TRUSTe.com guidelines are able to display a "trustmark" seal to inform users of their participation in the program.

Although there are other existing products currently available on the Internet which increase purchasers confidence in buying products on-line and minimize the potential liability exposure of the e-tailers, there are no products, prior to this invention, which would coordinate the entire concept into a one-click point-of-sale solution.

SUMMARY OF THE INVENTION

It is an object of the present invention to provide enhanced security of a business-to-business Internet transaction by virtue of financial guarantee supporting such transaction.

In accordance with the present invention a new on-line business method is provided which will enable on-line retailers to offer the following on-line financial guarantee services to their customers: the financial guarantee of a secure credit card transaction; the financial guarantee of a genuine product at the advertised purchase price; the financial guarantee of the delivery and return policy of the item being purchased; and the financial guarantee that the implied or specific warranty of the item purchased will be honored. All of the above services will be offered as a one-click point of sale solution.

Other objects, advantages and features of this invention will be more apparent hereinafter.

BRIEF DESCRIPTION OF THE DRAWINGS

A full understanding of the invention can be gained from the following description of the preferred embodiment when read in conjunction with the accompanying drawings in which.

DETAILED DESCRIPTION OF THE PREFERRED EMBODIMENT

Figure 1:
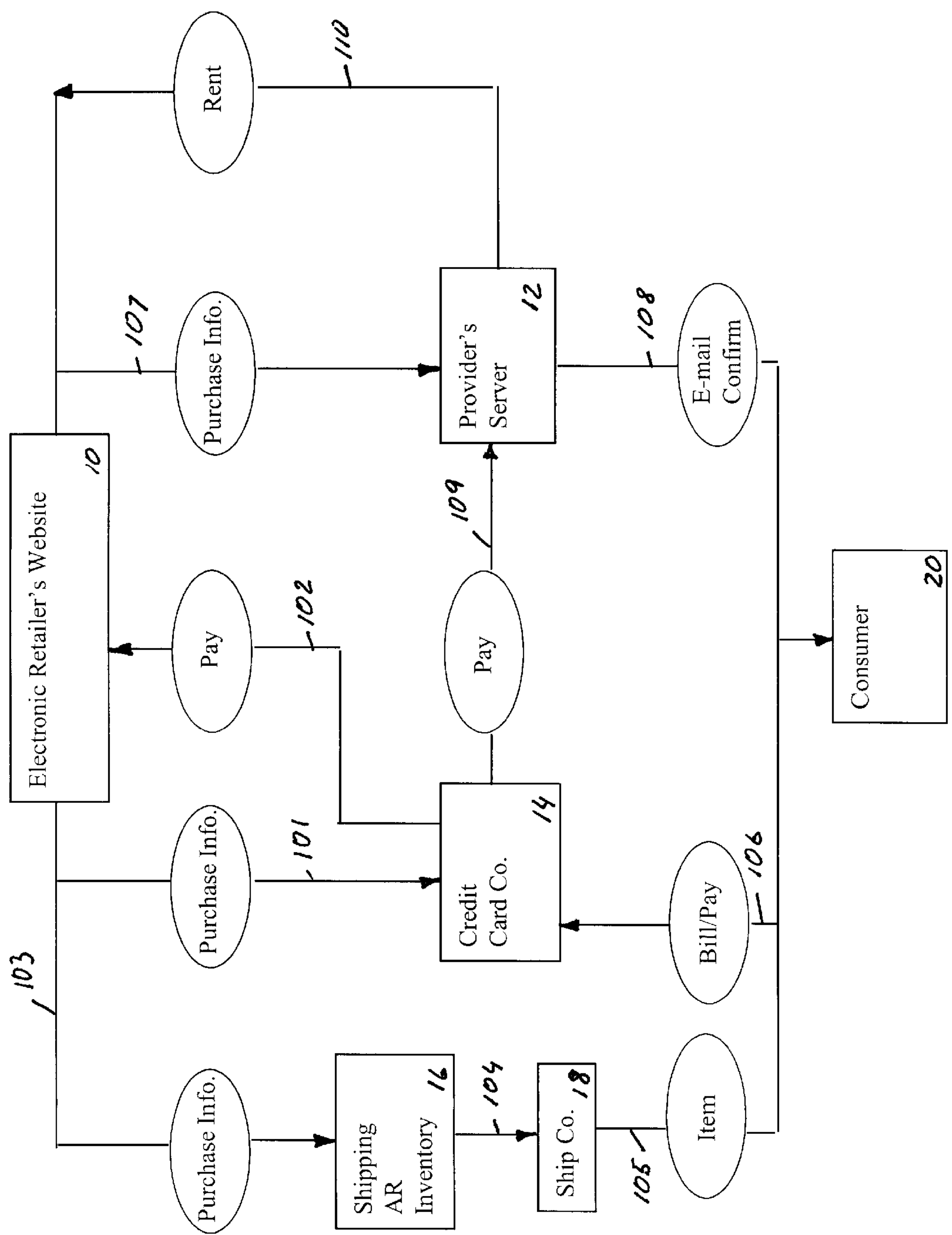
FIG. 1 is a schematic flow chart of the system for securing on-line commercial transaction in accordance with the present invention.

The following Detailed Description describes the invention in connection with the on-line business insurance software. Although described with respect to the business-to-business company website model, it is to be understood, however, that the invention can be implemented in connection with any other e-commerce model and/or transaction and on any Internet website regardless of its specific content.

In accordance with the present invention, an insurance product is provided for electronic retailers to be offered to their customers. The insurance product will preferably guarantee the following functions: a secure credit card transaction, purchase at the advertised price, delivery and return policy of the purchase, and guarantee that the implied or specific warranty of the purchase will be met.

By providing the financial guarantee of a secure credit card transaction, the customer is assured that the e-tailer's website has an Internet security system in place for the purpose protecting the on-line consumer against fraud and/ or the capture and misuse of their credit card information up to the amount of the purchase or the fraudulent charges, whatever is greater. Coverage to the purchaser by the guarantee would be triggered should the on-line purchaser's credit card information, with respect to fraud and/or capture and misuse, be proven to have occurred during the online transaction within a predetermined number of days.

The second guarantee offered to the purchaser is the guarantee that the price of the product being purchased is as advertised, and the product is genuine as represented at the time of purchase. Coverage to the purchaser by the insurance provider would be triggered by an improper charge to the purchaser's credit card or receipt of a non-genuine product. The liability of the insurance provider to the on-line purchaser will be limited to providing the genuine product, or refunding the difference between the actual amount charged compared with the advertised price at the time of purchase, for a predetermined number of days.

The financial guarantee of delivery and return policy of the purchase ensures that the e-tailer stands behind the terms and conditions of the purchase agreement with respect to the company's delivery and return policy, offering the purchaser restitution up to the amount of the purchase plus charges incurred for delivery and/or return of the merchandise. Coverage to the purchaser will be triggered should the e-tailer neglect their delivery and return policy within a predetermined period of time. The liability of the insurance provider will be limited to purchase price plus costs to the on-line purchaser associated with delivery and return of the merchandise.

E-tailers typically provide assurance that if they are the direct manufacturer of the purchased merchandise, they will guarantee the applicable implied or specific warranty period of the merchandised purchased. If the e-tailer is not the direct manufacturer of the purchased merchandise, than it will guarantee return delivery of the merchandise to the respective manufacturer for the on-line purchaser. The guarantee of the warranty period by the e-tailer is subject to the on-line purchaser abiding to the terms and conditions of the warranty offered at the time of purchase. Coverage to the consumer would be triggered should the e-tailer fail to honor its direct product warranty or fail to provide the on-line purchaser with return of the merchandise to the manufacturer for their execution of their warranty. The liability of the insurance provider is limited to the specific terms and conditions of the product warranty offered by the e-tailer or the product manufacturer at the time of purchase.

In accordance with the preferred embodiment, the provided on-line transaction insurance system will work in cooperation with the various electronic retailers which will modify their websites by implementing a call to the insurance provider's URL (Uniform Resource Locator) or WWW address. As shown in FIG. 1, the insurance provider will pay rent to the electronic retailer in exchange for this cooperation.

The initial stage of the insurance system, in accordance with the present invention, is initiated when the purchaser elects to submit the items that he/she has chosen to buy. At this point a question will be asked, "Do you wish to secure this transaction?". Along with this question a list of all the benefits offered by electing to secure the transaction will be presented to the purchaser:

1. The guarantee of secure credit card transaction;
2. The guarantee of the purchase of the product at the advertised price;
3. The guaranteed delivery and return policy of the item being purchased;
4. The guarantee that the implied or specific warranty for the item purchased will be honored.

In addition to the above question two buttons "Yes" and "No" will appear on the same screen. If the purchaser chooses not to take advantage of the insurance services by clicking "No", the transaction will continue as ususal. If the purchaser chooses to engage in the advantages of the insurance system, by clicking "Yes", the system will then transmit the appropriate information to the insurance provider's server, see FIG. 1. The appropriate information required is determined by how the insurance transaction will be handled, as described more fully below. The entire transaction is handled by the retailer's server or the insurance server (or both) and is not visible to the purchaser. The next screen presented to the purchaser is the screen displaying a total amount of the purchase, preferably including the insurance amount. As soon as the transaction is confirmed by the purchaser and authorized by the credit card company, the item is shipped and an e-mail confirming the insurance transaction and containing a certificate of financial guarantee or a bond is sent to the purchaser.

The general algorithm for handling the above described transaction is shown in the flow chart of FIG. 1. After the purchaser/consumer, block 20, has selected the desired item and authorized the financially secured transaction, the electronic retailer's website, block 10, preferably calculates the total amount due for the transaction, presents such information to the purchaser and, in step 101, submits purchase information including an instruction explaining what fraction of this amount should be paid to the insurance provider, block 12, to the purchaser's credit card company, block 14. In step 102, the credit card electronically authorizes the payment to the electronic retailer and bills the purchaser for the transaction in step 106. (The same step 106 represents payment of this bill by the purchaser). After the payment is authorized or simultaneously with the request for authorization, the electronic retailer in step 103 submits the detailed information about the purchase, including the description, item number and desired quantity of the selected item, to the shipping division, accounts receivables and inventory, block 16. The desired item is then transferred to the shipping company, block 18, step 104, and is shipped to the consumer in step 105. In order to completed the financially secured transaction, the electronic retailer, in step 107, submits the required purchase information to the insurance provider's server, block 12, which uses this information to issue a certificate of financial guarantee and to send this financial guarantee together with the e-mail confirming the transaction in step 108 to the purchaser. The insurance provider is preferably paid by the credit card company directly, step 109, for its portion of the total amount due. As mentioned above, in step 110 the insurance provider pays rent to the electronic retailer in exchange for e-tailer's cooperation in securing the transaction.

As shown in FIG. 1, the purchase information is distributed by the electronic retailer's website to the provider's server, which in turn uses this information to issue a certificate of financial guarantee and to bill the purchaser's credit card (if the provider handled the transaction); to the purchaser's credit card company, which bills the purchaser for the amount submitted by and paid to the on-line retailer and/or insurance provider; and to the shipping division, accounts receivables and inventory to accomplish an actual shipment of the requested item.

Figure 2:
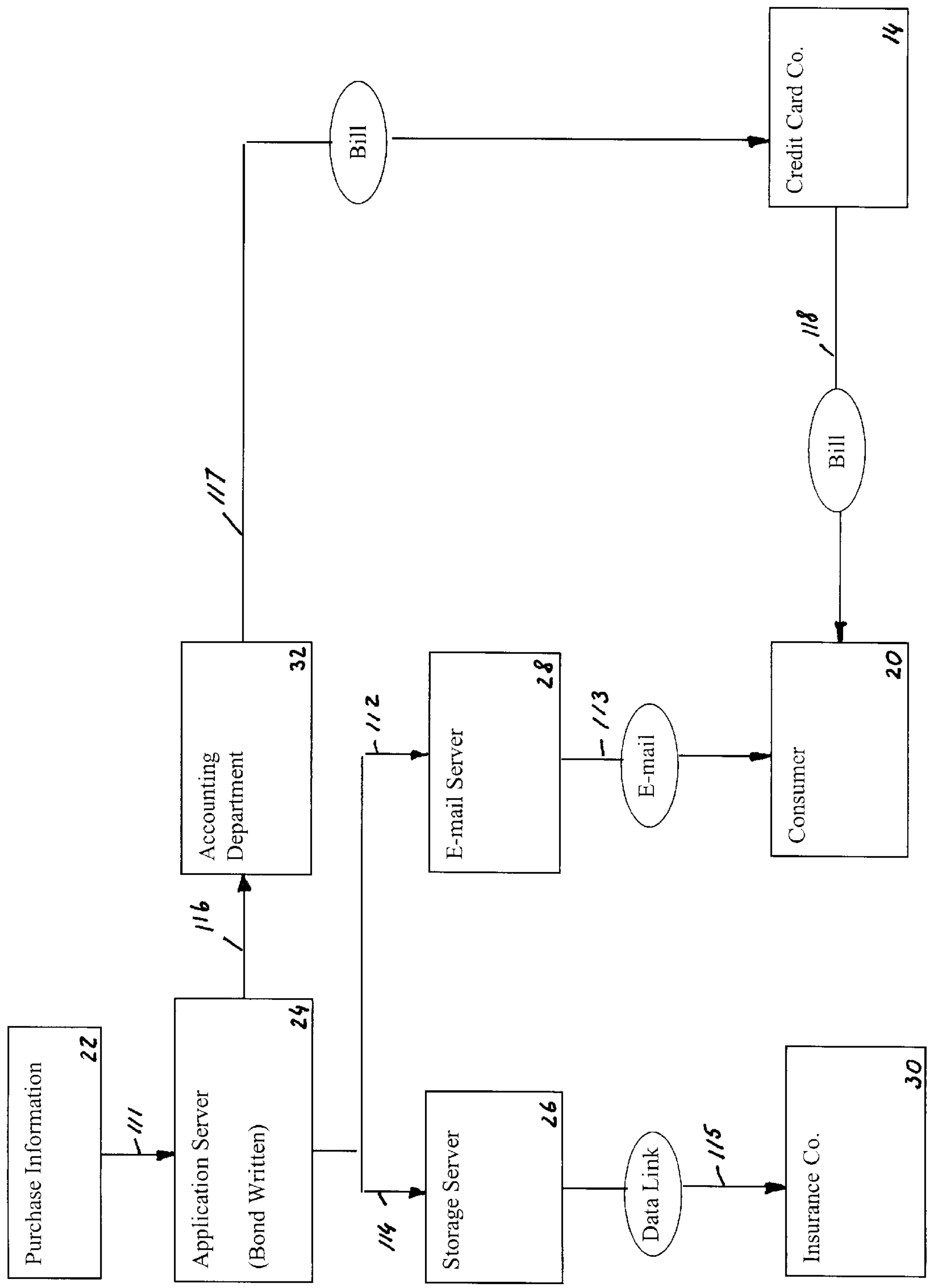
FIG. 2 is a schematic flow chart of dissemination and use of the purchase information within the insurance provider's server.

FIG. 2 is flow chart of the algorithm performed within the insurance provider's server. As shown in FIG. 2, the purchase information 22, transferred to the provider's server from the retailer's website in step 107, is directed in step 111 to the application server component, block 24, of the insurance provider's website, where the bond is issued and submitted to the e-mail server, block 28, step 112, to be e-mailed to the purchaser, block 20, step 113, preferably as soon as the purchase information is received. The same purchase information is sent in step 114 to be stored on the storage server component, block 26, data-linked by step 115 to the physical insurance company, block 30. The purchase information stored on the storage server component may be accessed later if a claim is initiated by the purchaser. The accounting department, block 32, will also receive the purchase information in step 116 and will initiate billing of the purchaser's credit card, block 14, in step 117, if the amount due for securing the conducted transaction is to be calculated and billed by the insurance provider. Otherwise the accounting department will just store the received transaction information until the appropriate payment is received from the credit card company. If the credit card was billed for the securing component of the transaction separately, a separate bill will be sent to the purchaser in step 118 for the appropriate amount.

Figure 3:
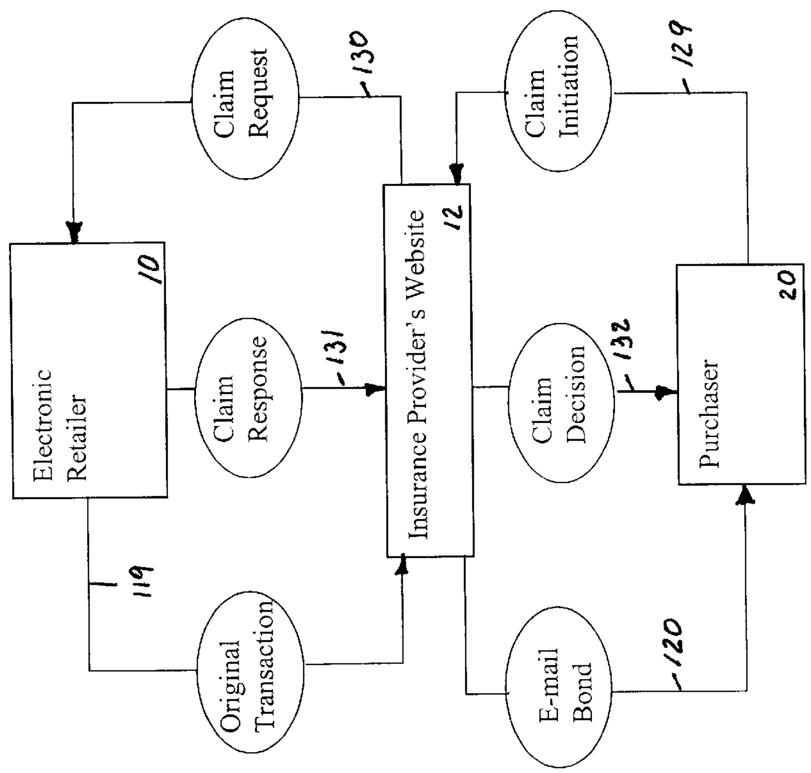
FIG. 3 is a schematic flow chart of the preferred embodiment of the present invention wherein calculation of the total amount due from the purchaser is done at the retailer's website.

In accordance with the preferred embodiment of the present invention, shown in FIG. 3, the insurance transaction is added to the original purchase price and calculated by the electronic retailer. In this case, after the purchaser agreed to secure the transaction, the e-tailer'server will calculate the additional amount based on the amount of the purchase and add it to the original amount due for the transaction. The following required information about the original transaction is then transmitted to the insurance provider's website in step 119:

a. purchaser's name;
b. purchaser's home address;
c. purchaser's e-mail address;
d. e-retailer name/unique identifier;
e. e-retailer transaction number; and
f. purchase amount. The insurance provider will then issue a bond, in accordance with the received purchase information, and send it to the purchaser in step 120.

Figure 5:
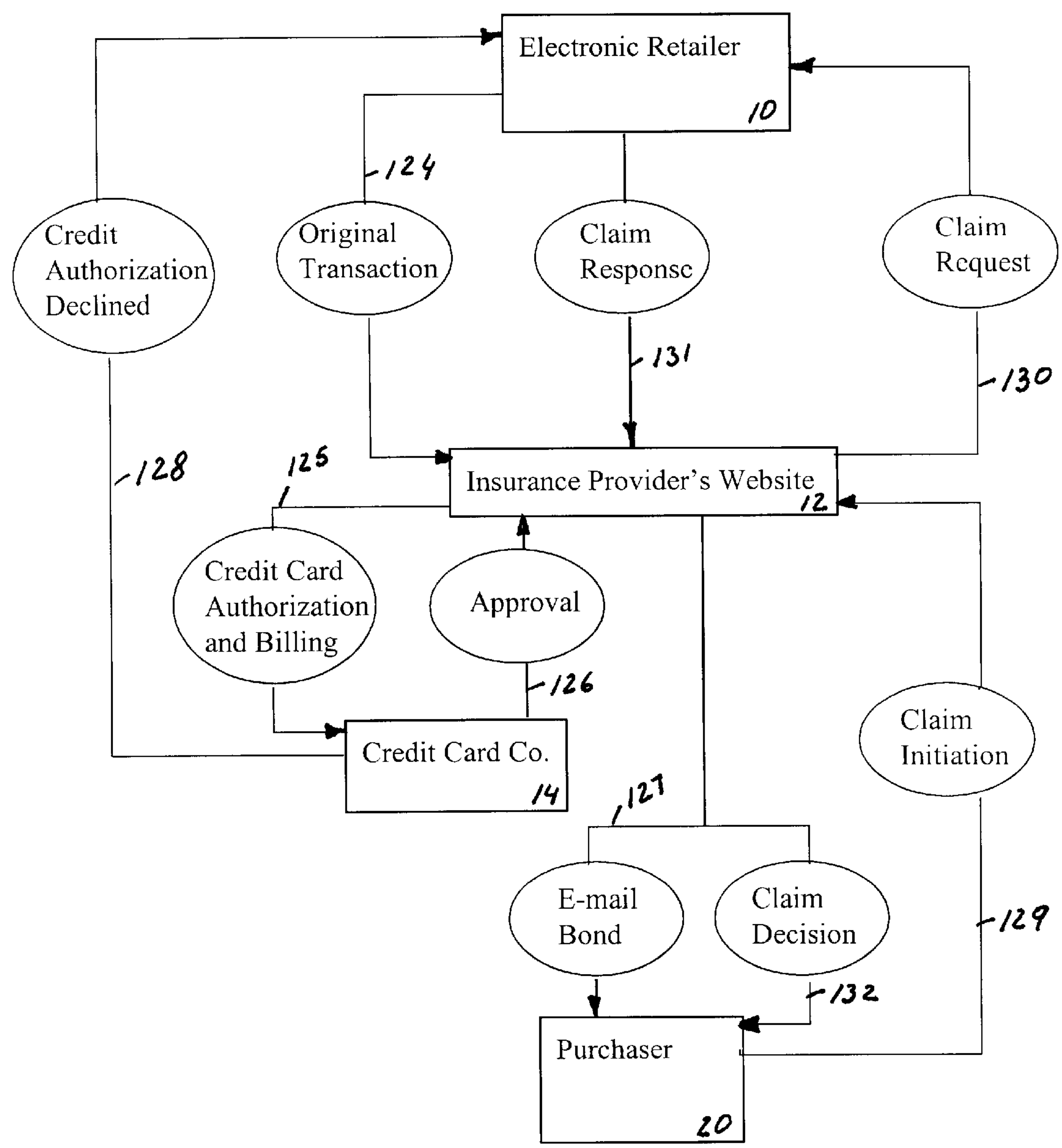
FIG. 5 is a schematic flow chart of a further preferred embodiment of the present invention wherein the amount due for the insurance transaction is calculated by the insurance provider at its website and is submitted as a separate bill to the purchaser's credit card.

In accordance with another preferred embodiment of the present invention, the insurance transaction is calculated by the insurance provider and added to the original purchase price. In this embodiment, shown in FIG. 4, the electronic retailer, block 10, will submit the required information about the original transaction to the provider in step 121, the provider will then calculate the additional transaction amount based on the amount of the purchase and will return that amount back to the e-tailer website in step 122, where that amount will then be added into the final purchase price. The insurance provider will then issue a bond, in accordance with the received purchase information, and send it to the purchaser in step 123. The following required information will then be stored at the provider's website:

a. purchaser's name
b. purchaser's home address;
c. purchaser's e-mail address;
d. e-retailer name/unique identifier;
e. e-retailer transaction number;
f. purchase amount In accordance with another preferred embodiment of the present invention, the insurance transaction is separated from the original purchase. As shown in FIG. 5, the electronic retailer submits the required purchase information in step 124 to the insurance provider, block 12, which then calculates the amount due from the purchaser for the financial services and sends the bill in step 125 to the purchaser's credit card company, block 14. In this case, the credit card transaction will be a separate charge billed by the provider to the purchaser's credit card and will appear as a separate item on the purchaser's credit card statement. After the credit card number is authorized in step 126, the billing amount will be sent to the credit card company directly from the insurance provider. In this case, a certain percentage is charged by the credit card company and must be accounted for in the transaction. The insurance provider will then issue a bond, in accordance with the received purchase information, and send it to the purchaser in step 127. If the credit authorization is declined, the credit card will notify the electronic retailer in step 128, who will in turn notify the insurance provider. The following required information will then be stored at the provider's website:

a. purchaser's name
b. purchaser's home address;
c. purchaser's e-mail address;
d. e-retailer name/unique identifier;
e. e-retailer transaction number;
f. purchase amount;
g. credit card number;
h. expiration date;
i. name as it appears on the card;
j. billing address.

Once the information is received by the provider, the data is stored on the storage server component and a bond or a certificate of financial guarantee is e-mailed to the purchaser's e-mail address using the Internet link templates. In addition to the bond the e-mail will contain a link to the provider's website to enable the purchaser to e-mail his/her claim back to the provider. The link in the e-mail will connect the purchaser to a page on the provider's site that contains the information for that particular purchaser and that particular purchase. To initiate the claim the purchaser will simply have to press the "submit claim" button.

Figure 4:
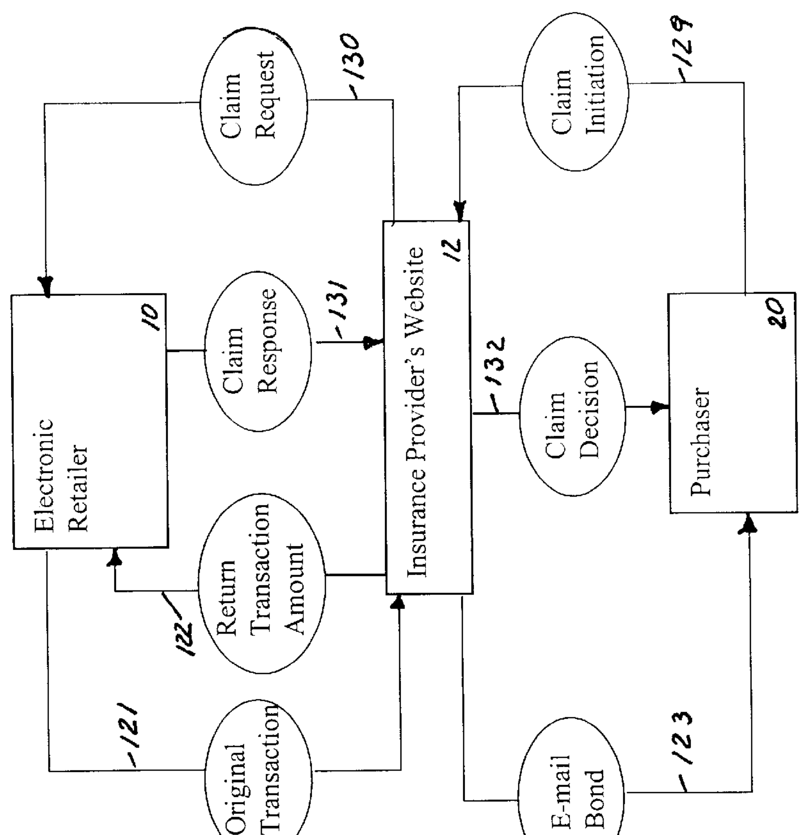
FIG. 4 is a schematic flow chart of another preferred embodiment of the present invention wherein the amount due for the insurance transaction is calculated at the provider's website and then added to the amount due for the purchase at the retailer's website.

The claim processing algorithm is shown in FIGS. 3–5. Once the claim is submitted by the purchaser in step 129, a file indicator will be turned on by the server to indicate that a claim has been initiated. The claim will then be e-mailed in step 130 to the appropriate electronic retailer with the information pertaining to this claim. The e-tailer will need to evaluate the claim and then respond back to the provider's claim department in step 131. Once the provider receives the status of the claim from the retailer, the results will be e-mailed back to the purchaser in step 132.

Having described this invention with regard to specific embodiments, it is to be understood that the description is not meant as a limitation since further variations or modifications may be apparent or may suggest themselves to those skilled in the art. It is intended that the present application cover such variations and modifications as fall within the scope of the appended claims.

What is claimed is:

1. A system for securing on-line commercial transactions, comprising:

a. means for conducting a commercial transaction on-line between a purchaser and an electronic retailer;
b. a single-action component that in response to only a single action being performed by said purchaser, submits a request to secure said commercial transaction along with information about said commercial transaction to an insurance provider's server, calculates an additional amount which said purchaser has to pay to secure said commercial transaction, and displays a total amount due from said purchaser for a secured commercial transaction; and c. means for sending to said purchaser a certificate of financial guarantee in response to said purchaser's agreeing to pay said total amount due for said secured transaction.

2. A system for securing on-line commercial transactions in accordance with claim 1, wherein said single-action component calculates said additional amount on a retailer's server.

3. A system for securing on-line commercial transactions in accordance with claim 1, wherein said single-action component calculates said additional amount on said insurance provider's server.

4. A method for securing commercial transactions conducted on-line, comprising the steps of:

a. conducting a commercial transaction on-line between a purchaser and an electronic retailer;

b. in response to only a single action being performed by said purchaser, submitting a request to secure said commercial transaction along with information about said commercial transaction to an insurance provider's server, calculating an additional amount which said purchaser has to pay to secure said commercial transaction, and displaying a total amount due from said purchaser for a secured commercial transaction; and c. in response to said purchaser's agreeing to pay said total amount due for said secured transaction, sending to said purchaser a certificate of financial guarantee.

5. A method for securing commercial transactions conducted on-line in accordance with claim 4, wherein said step of calculating an additional amount which said purchaser has to pay to secure said commercial transaction is performed by said electronic retailer.

6. A method for securing commercial transactions conducted on-line in accordance with claim 4, wherein said step of calculating an additional amount which said purchaser has to pay to secure said commercial transaction is performed by said insurance provider on said insurance provider's server.

7. A method for securing commercial transactions conducted on-line in accordance with claim 4, wherein said single action is clicking a button.

8. A system for providing a financially secured transaction on-line, comprising:

a. an electronic retailer's website, said retailer's website is configured to present to a purchaser information about a product selected by said purchaser;

b. an insurance provider's server, further comprising a storage server, said storage server being configured to store data about said financially secured transaction, and an e-mail server, said e-mail server being configured to send to said purchaser an e-mail containing a certificate of financial guarantee;

c. means for calculating an amount which said purchaser has to pay to secure purchase of said selected product; and d. means for billing said purchaser for said financially secured transaction.

9. A system for providing a financially secured transaction on-line in accordance with claim 8, wherein said means for calculating an amount which said purchaser has to pay to secure purchase of said selected product is located on said electronic retailer's website.

10. A system for providing a financially secured transaction on-line in accordance with claim 8, wherein said means for calculating an amount which said purchaser has to pay to secure purchase of said selected product is located on said insurance provider's server.

11. A system for providing a financially secured transaction on-line in accordance with claim 10, wherein said means for billing said purchaser for said financially secured transaction is located on said electronic retailer's website.

12. A system for providing a financially secured transaction on-line in accordance with claim 10, wherein said means for billing said purchaser for said financially secured transaction is located on said insurance provider's server.

13. A system for providing a financially secured transaction on-line in accordance with claim 8, further comprising claim initiating means for initiating an insurance claim when a predetermined condition of said financially secured transaction is not fulfilled.

14. A system for providing a financially secured transaction on-line in accordance with claim 13, wherein said claim initiating means is embedded within said e-mail containing said certificate of financial guarantee which is sent to said purchaser from said e-mail server.

15. A system for providing a financially secured transaction on-line in accordance with claim 13, wherein said claim initiating means are configured to allow said purchaser to access said data about said secured transaction stored on said storage server.

* * * * *